United States Patent Office 3,795,533
Patented Mar. 5, 1974

3,795,533
PRESERVATION AND STRENGTHENING OF POROUS SOLIDS
Kharaiti Lal Gauri, Louisville, Ky., assignor to Research Corporation, New York, N.Y.
Filed Nov. 24, 1971, Ser. No. 201,871
Int. Cl. B27k 3/34; C04b 41/28
U.S. Cl. 117—54    13 Claims

ABSTRACT OF THE DISCLOSURE

A porous solid is preserved and strengthened by sequentially impregnating into said solid, a plurality of solvent mixtures, wherein each of the sequentially impregnated mixtures contains a higher concentration of curable polymeric material than the previously impregnated mixtures. The adjacent, sequentially impregnated mixtures are allowed to remain in contact, within the porous solid, so as to permit diffusion of the polymeric material therebetween, and to minimize the presence of distinct concentration boundaries. Upon curing, the resin forms an impregnate of continuously increasing concentration from the innermost portion of the impregnated solid to the surface of the solid. In one embodiment, the first of said sequentially applied mixtures may be a solvent treatment procedure, with a water-miscible solvent, or, more preferably, with a plurality of sequentially impregnated mixtures of water and solvent of increasing solvent concentration, wherein the final solvent impregnate is an anhydrous water-miscible solvent.

BACKGROUND OF THE INVENTION

Field of the invention

Figure 1:
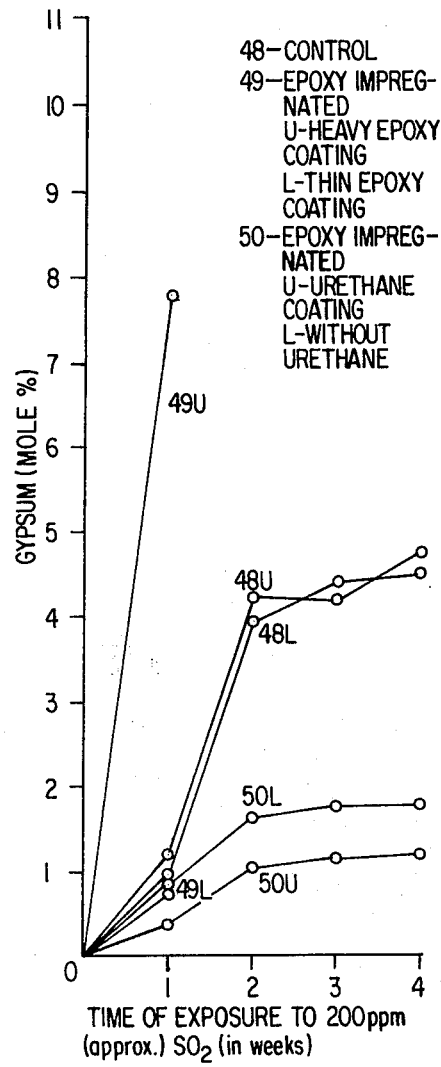

This invention relates to a process for impregnating porous solids with a curable, hydrophobic, polymeric material. More particularly, this invention relates to a process for deeply impregnating a porous solid with a composition containing a curable hydrophobic polymeric material of gradually increasing concentration from the inner-most portion of the impregnated solid to the surface, which increases the chemical resistivity of the solid to atmospheric pollutants, and increases the mechanical strength of the solid. This invention further relates to a technique for treating the pores of the solid to remove contaminants therefrom, prior to said impregnation procedure, which cleaning technique additionally, and synergistically, provides deeper impregnation of the polymeric material.

Description of the prior art

A wide variety of materials and methods have been described for coating or impregnating porous solids with polymeric materials in order to modify different properties of the solid, such as mechanical strength, gas permeability, surface reactivity, and the like. In recent years, particular attention has been focused on techniques involving either coating or impregnating solids of relatively low porosity, particularly wood or stone, such as marble, limestone, sandstone or the like. These efforts have been intensified as the side effects of industrialization have greatly accelerated aging and deterioration of centuries-old works of art, many of which have suffered more damage in recent decades than in all the past centuries since the stone was first quarried.

Studies have indicated that a major cause of such deterioration is the increasing presence of acid-producing gases in the atmosphere, including carbon dioxide, sulfur dioxide, hydrogen sulfide, and nitrogen oxide, largely from industrial pollution. These gases readily diffuse into the most minute pores of even relatively impermeable material, such as marble, and, in combination with water or water vapor, forms acids which can attack the pore walls beneath the surface of the material. For example, carbon dioxide and sulfur dioxide can react with water vapor in marble to form water-soluble salts, such as gypsum, calcium bicarbonate, and hydrated magnesium sulfates. The leaching of such salts is largely responsible for the deterioration of the stone.

One technique which the prior art has considered was to form a protective coating over the surface of the solid, which would prevent entry and chemical reaction of the contaminants. A wide variety of hydrophobic resinous coatings, which are resistant to water, carbon dioxide, sulfur dioxide, hydrogen sulfide, nitrogen oxide, or the like, have been suggested for this purpose. Even with the use of such protective layers, however, gases and water vapor may still remain or enter into the pores of the solid, and such residuals can continue to react to cause deterioration beneath the coated surface.

To avoid such sub-surface deterioration, it has been suggested to impregnate the pores of the porous solid with a protective resin. However, that technique has proven to be quite difficult, especially when the material being treated is very thick, or of varying density or porosity, as in the case with stones, which have already suffered serious surface deterioration. In these tyeps of materials, boundaries will sometimes exist between the badly degraded surface layers and the deeper, more intact layers. Generally, a more dense impregnate is required at the surface to bind the loose particles and to increase the surface strength, while a less dense impregnate is required for adequate diffusion into the deeper pore regions of the solid.

Optimum impregnation into the sub-regions of the porous material can often be achieved only by the use of different materials or techniques for each layer. However, such methods are generally unsatisfactory, since the depth of impregnation is usually limited and the existence of distinct boundary layers may, in some instances, cause the formation of different thermal expansion regions which might result in a non-uniform seal within the pore, or might even cause damage to the pores.

For instance, the Dietz et al., U.S. Pat. 3,080,253, describes a method for sequentially treating concrete surfaces with resin-solvent mixtures of increasing resin concentration, in which each layer is cured before applying the next layer. While the Dietz et al. method is somewhat an improvement over other prior art methods, that technique does not permit sufficiently deep penetration of the pores to prevent structural damage deep within the porous material. Moreover that technique will result in the formation of distinct boundaries which might cause thermal expansion difficulties. Another difficulty with the Dietz et al. method is that it requires the application of a thick epoxy coating over the surface which tends to seal water moisture into the solid and tends to deleteriously absorb gases, such as $SO_2$ and $CO_2$ therein.

Another difficulty with such impregnating or coating techniques of the prior art, is the necessity of preserving some degree of porosity in the material. When water is present in the porous system, beneath a completely sealed surface, freezing and thawing can develop severe internal stresses, leading to cracking of the material. This problem is amplified when dealing with materials which have anisotropic thermal expansion properties, such as calcite, since alternate expansion and contraction, such as may be caused by temperature fluctuations or freezing and thawing of water trapped in the fissures, can cause further deterioration.

Another method for impregnating porous materials with resin has been suggested in Rubenstein, U.S. Pat. 3,145,502, which describes the use of a resin-solvent mixture using a volatile solvent. The solvent evaporates under specified impregnation conditions, which tends to push the resin deeper into the pores. While somewhat satisfactory for highly porous material, such as sandstone, this process works poorly for effecting deep penetration in low porosity material, such as marble, in which neither capillary pressure nor mass transport is adequate, either due to the poor penetration of high viscosity media into the fine pores, or due to the tendency of low viscosity media to diffuse outwardly during curing.

It would be desirable, therefore, to provide a method for deeply impregnating a low porosity material, which does not rely solely upon inefficient capillary pressure or mass transport for penetration.

Another problem which has been encountered in attempting to protectively impregnate porous objects is that frequently undesirable amounts of residual gases, such as sulfur dioxide, carbon dioxide, nitrogen oxides, or water, as well as occlusions, caused by reactions of these materials within the pore walls, may be present. While many of these contaminants are water-soluble, residual water itself is equally undesirable for reasons previously mentioned. Furthermore, water inhibits polymerization or curing in many resin systems used to impregnate porous materials, thereby posing an additional difficulty. Thus, it would be highly desirable to have available a method whereby such contaminant materials could be removed from pores without leaving residual water or other residual contaminants.

A need exists, therefore, for a process of impregnating porous solids which provides deep impregnation with a chemically resistant resin, which only partially closes the pore space of the solid, so as to preclude the entrance of harmful or damaging pollutants or contaminants, and which imparts physical strength to the material, especially where such material has already been weakened by chemical deterioration. Moreover, a need exists for such an impregnation process wherein the impregnate will not form unique sub-boundaries within the solid which could cause thermal expansion difficulties.

SUMMARY OF THE INVENTION

Accordingly, one object of the present invention is to provide a process for deeply impregnating porous solids with a curable hydrophobic polymeric containing material, whereby a continuous concentration spectrum of graduated cured polymer is obtained, and formation of distinct boundary layers is avoided.

Another object of the present invention is to provide a process for impregnating porous materials which maintains the porosity of the material, thereby minimizing susceptibility to damage due to internal stresses.

Still another object of this invention is to provide a process for cleaning and chemically dehydrating porous materials prior to impregnation.

An additional object of the present invention is to provide a process for protecting partially decomposed stone surfaces.

A still further object of this invention is to augment the physical strength of porous building materials, such as concrete, sandstone, or the like.

One specific object of this invention is to provide a process for restoring art works which have been damaged by exposure to air pollution, or to prevent pollution damage to new art works.

Briefly, these and other objects, which will hereinafter become more apparent, are attained in one aspect of the present invention, by providing a process for impregnating porous solids with a protective resin, by sequentially impregnating a plurality of solvent mixtures into said solid, wherein each sequentially applied mixture has a higher concentration of polymeric material than the previously applied mixture; allowing the adjacent, sequentially applied mixtures to remain in contact with each other within the porous solid, for a period of time sufficient to permit diffusion of the polymeric material between adjacent mixtures, and thereby minimize the formation of distinct concentration boundaries therebetween; and thereafter curing the diffused polymeric material to form a hard impregnate of substantially continuously, inwardly decreasing concentration. The first solvent mixture application may be a treatment with a water-miscible solvent, in order to remove residual contaminants which might be present within the pore system, and to assist in obtaining a synergistically deeper penetration of the resin into the pores, whereby a plurality of water-solvent mixtures of increasing solvent concentration are sequentially impregnated into the solid.

DETAILED DESCRIPTION OF THE INVENTION

While essentially any porous solid may be treated by the methods of the present invention, these methods are particularly well suited for materials having a small pore size and low porosity, although very good results are also obtainable with materials of varying density and porosity characteristics, such as weathered stone, compressed or natural woods, weathered sandstone, limestone or marble, or the like.

Since this technique will both enhance the strength characteristics of porous materials, and will impart protection from atmospheric pollutants, it is especially well suited for application to natural and artificial stones employed in building, architecture, statuary or even road construction. Other materials which can be treated with good results include shale, granite, plaster, porphyries, asbestos board, slate, etc. In fact, any porous natural or artificial stone or wood, even those having pore sizes of from $10^{-8}$ to $10^{-4}$ cm. may be treated in the manner of this invention. Of course objects having larger pore sizes can be impregnated even easier by this technique. Successful impregnations were obtained with objects having pore diameters as large as ½ mm.

A wide variety of polymeric materials may be used to impregnate the porous solid. The only limitation is that the polymer selected must be capable of being deeply penetrated into the pores of the solid treated. The polymer must also not be deleteriously affected by evaporation of the solvent, and it must be capable of being cured to a resin which is resistant to water, and to the acids formed from hydrogen sulfide, carbon dioxide, sulfur dioxide, or other common atmospheric pollutants.

For instance, suitable polymeric materials which may be used in this invention include the chemically resistant curable polymers, or those monomers which can be polymerized into a chemically resistant curable polymer. Good results are obtainable, for instance, with the epoxides, the unsaturated polyesters, the polyacrylates, including the polyalkylacrylates, the polyalkylalkacrylates, the hydrolyzed polyacrylates, polystyrene, copolymers of styrene and acrylonitrile, polyurethanes, silicone resins, or the like. Particularly suitable resins are the epoxy resins having inherent viscosities of from 150 to 20,000 cps. identified by the trade names Epirez 510, 504, and 502, and Aralidite E (CY 232) with Hardener HY 951 produced by Ciba-Geigy Corporation, Maraglass Type A655 of Rohm & Haas Chemical Corporation, and the acrylic resins, such as those identified as the Acryloid resins, or the like.

In general, the epoxy resins are preferred because of their high strength and good elasticity, which enables them to absorb high internal stresses, and also because of their easy curability, without high shrinkage, and their capability of providing a good bond within the pore system.

When treating dense stone, such as marble, it is desirable to use a high viscosity resin in the peripheral regions of the porous material, in order to hinder possible outward flow of lower viscosity resin from the depths of the specimen. In particular, if the pores of the solvent are very large, inert materials, like silica gel, are mixed into the resin prior to impregnation to prevent the resin's outward diffusion.

Any of a variety of cross-linking agents may be included in the polymeric system to enhance curing, such as divinyl benzene, alkylacrylate, ethylene glycol dimethylacrylate, diethylamine, or the like, depending, of course, upon the particular polymer used.

Any conventional curing mechanism can be employed, including chemical curing or curing initiated by high energy ionizing radiation. In general, however, it is preferable to use chemical curing mechanisms, since they are usually much easier to employ under field conditions. Particularly, when the methods are used to impregnate wood or like materials, high energy ionizing radiation can tend to weaken the structure of the treated material. Suitable chemical curing agents include the conventional free radical initiators, such as the peroxides, the peroxy acids, or the redox catalysts, or the like.

Various conventional plasticizers or inert filler materials may also be included into the system, such as silica gel or the like, depending upon the ultimate properties required in the cured resin. Any of a number of solvents may be used for the prior cleaning procedure, or for the formation of the polymer containing impregnating solution, or for both procedures. The same or different solvents may be used, or any of a variety of combinations of solvents may be used.

Suitable hydrophilic solvents which are usable herein include dimethylsulfoxone, the aliphatic and aromatic alcohols, the ketones, dioxane, or glycol ethyl ether. Suitable hydrophobic solvents which are usable, include benzene, toluene, xylene, or the like, or mixtures of any of these. These listings, of course, are only representative, and should by no means be considered exclusive. It is most preferable to use a solvent, or a solvent mixture, containing at least one water-miscible solvent, or hydrophilic solvent for the initial cleaning treatment. Glycol ethyl ether is particularly suitable for this purpose, since it has a relatively low vapor pressure which permits easy outdoor application. The particular selection of the solvent, however, will depend upon such considerations as the solubility of the degradation products of the porous material being treated, the volatility of the solvent under the curing conditions of the polymer, and the surface tension of the solvent, which will have a significant effect on the potential depth of penetration of the solvent. In applying the initial solvent treatment, a suitable solvent, such as acetone, is admixed with water, since such mixtures have a greater surface tension than that of the solvent alone, and accordingly will penetrate more deeply into the fine pores and capillaries of the porous material. The surface of the porous solid to be treated may be first washed by conventional means to remove gross contaminants, and then is treated sequentially with water-solvent mixtures of increasing solvent concentration. The final treatment is with the solvent alone, in order to prepare the solid for further impregnation with the polymer-solvent solution. This cleaning treatment functions to remove any water-soluble impurities or any residual water moisture from the pores, and further serves to permit the subsequently applied polymer to be synergistically penetrated deeper into the pore system. In fact, impregnation of the polymeric material after the solvent treatment enables the polymeric material to penetrate as deep as the capability of the absolute solvent to enter the pore space. In pores of less than one micron in size, when using acetone as the solvent, penetration of the solvent to a depth of about one inch in approximately ¾ hour is possible. When a 50% by volume concentrated epoxy resin solution is impregnated into the pores, the diffusion mixing and exchange mechanisms with the acetone will permit penetration almost to the maximum within ½ hour. The compressive strength of the solid at these deeper regions will not be appreciably improved, since the resin will be present only in very small amounts. However, those small amounts will be sufficient to provide a chemical resistant protective film around the grains of the porous material. Impregnation with correspondingly diluted resin solution, i.e., 50% by volume epoxy solution in acetone, will result in a more shallow penetration, and just as undesirably, a larger volume of the pore space will be occupied. In other words, the total amount of the final resin within the porous solid will be smaller when the resin impregnation is preceded by the solvent treatment.

It is theorized that the deeper pentration which occurs after the initial solvent treatment is a result of diffusion exchange by the applied polymer composition into the previously applied solvent, which, because of its lower viscosity, is usually able to penetrate further into the porous solid, then would be possible with a polymer-solvent mixture above. In particular, where an extremely deep penetration is required, or where the size of the pore in the densist part of the stone makes penetration particularly difficult, it is extremely desirable to use this prior solvent treatment procedure.

As mentioned above, it may be desirable to pre-clean the porous solid by other means, even before the initial solvent treatment. For instance, heavy deposits of soot or organic dirt may be removed by treatment with hydrofluoric acid or ammonium bifluoride and the calcium fluoride layer so produced may be physically removed by abrasion.

Another advantageous aspect of using the prior cleaning procedure is that it serves to remove oxygen from the pores, which might otherwise inhibit the curing reaction. More efficient curing is therefore possible.

It is desirable to keep the pore surfaces wet at all times once treatment has begun, in order to insure maximum efficiency of the present method, and to prevent entry of air into the pores, prior to impregnation of the polymeric material. In particular, it is desirable that the entire procedure from the cleaning process to the final impregnation of the polymeric material be performed in close succession with minimum time intervals between each procedure, in order to maximize the diffusion exchange pressures.

A large number of sequentially applied mixtures of solvent and water can be used in this procedure, almost without limitation. The requirements of the cleansing action and good depth penetration for the subsequently applied polymeric material, however, can be satisfied with one application of solvent alone or one or two applications of a 95:5 solvent-to-water mixture, followed by one application of the solvent alone.

In applying the curable polymeric composition, a sequence similar to that indicated for the cleansing solvent treatment may be used; that is, a plurality of mixtures of increasing polymeric material concentration is applied sequentially to the porous solid. There is no limit to the number of mixtures which may be applied, although for most purposes, one to ten polymeric containing material solutions will be sufficient. For instance, two to three applications of an epoxy-acetone mixture will be sufficient if the first mixture has a 50% concentration of solvent. If only one polymeric solution treatment is applied, it must be preceded by at least one or preferably more solvent treatment as above described. The actual number of solution treatments, of course, will depend upon the nature of the surface being treated, the porosity of the solid, the size of the pores, and the physical characteristics of the treating solution, such as viscosity, etc. In general, the more dilute the polymeric solution used, the thinner will be the resulting film obtained. The thinner the film, the less resin is used, and the smaller the size of the perforations which will be found in the film as the solvent is evaporated from the impregnated object. It is most desirable, therefore, to use relatively dilute solutions to conserve resin and to reduce the size of the perforations in the film found within the pores.

Any conventional method may be used for impregnating the porous solid with the polymeric solution. For instance, application may be by brushing, soaking, immersing, or by continually wetting and absorbing the solution on an absorbent material such as cheesecloth, which is maintained in contact with the solid being treated.

A critical feature of applying the resinous material in this method is that diffusion exchange functions as a driving force, in addition to capillary action and bulk diffusion, to cause deep penetration of the polymeric material into low porosity substrates. This is effected by allowing the sequentially applied mixtures of different polymer-solvent content to remain in contact with one another prior to curing, so that some of the more dense polymer material can, by diffusion exchange, blend with the less dense material, to give a graduated spectrum of continuously varying polymer content, rather than distinct boundary layers. The period of time prior to curing may be from ¼ hour to 3 weeks, although longer or shorter periods may provide equally good results. The cure period may be of a duration of from ¼ hour to 3 weeks, or even longer, depending upon the particular resin system and the rate of solvent evaporation from the pores.

The number of sequential mixtures of curable polymeric material applied, the difference in concentration of curable polymer in each mixture, and the relative amounts will be determined by the nature of the surface being treated. Thus, when treating surfaces such as freshly cut marble, the major desired effect will generally be to obtain deep penetration, and accordingly solutions of relatively low polymer content will be used. On the other hand, when dealing with porous materials, such as sandstone, higher polymer content solutions may be used initially. In any event, it is desirable to have an outer layer of more concentrated curable resin, since the presence of higher concentration resin in the outer layers will function to inhibit outward migration of the inner, low concentration resin during curing.

Following the last polymeric impregnation procedure, the surface of the porous solid is wiped substantially clean with an appropriate solvent, so as to leave, at most, only a very thin film of one to twenty microns in thickness. The purpose of cleaning the surface is to avoid plugging of the pores and to avoid damaging the original finish of the solid. Even if a very thin film of the polymeric material remains on the surface, during curing of the resin in the pores, the solvent being removed by evaporation will penetrate the film and leave it in a substantially porous condition. Moreover, such a very thin film will not adversely affect the surface characteristics, or the texture of the original surface. For instance, if an epoxy resin is coated onto the surface in sufficient thicknesses, the surface will have an undesirable resinous appearance, and may be susceptible to coloring changes upon exposure to ultraviolet light. Hence, it is important, particularly in situations involving treatment of art works, to remove as much of the polymeric surface coating as possible, usually before curing is complete.

Further protection against common pollutants can be provided by coating the surface of the porous solid with a suitable transparent protective coating. Particularly suitable protective coatings for this purpose are the acrylic resins or the polyurethanes. Especially preferred is Acryloid B-66 (Rohm & Haas Chemical Corp.), which is impervious to acids, such as carbonic, hydrochloric, sulfuric, and acid gases, such as $CO_2$ and $SO_2$, etc.

An epoxy resin finish is not desirable, for this purpose, not only for the reasons stated above, but also because the above-mentioned acids and acid gases are permeable, to some extent, through the epoxy layer.

Having generally described the invention, a further understanding may be obtained by reference to the following illustrative examples, which are included herein for the purposes of illustration only and are not intended to be limiting unless so specified.

Example 1

A marble stone 3 mm. x 4 mm. was immersed in an acetone water mixture having a ratio of 95:5 by volume. Since this marble stone was believed to contain a large amount of water-soluble salts, it was first treated with a 50:50 solution and then a 75:25 solution. Each application lasted ½ hour.

In other experiments, the solvent solutions were applied by wrapping the object in a cheese cloth (muslin, etc.) and the solvent mixture was applied by dripping or spraying.

The surface of the marble was maintained in a wet condition between each solvent mixture application, between the solvent mixture application treatment and the subsequent polymer solution treatment, and between each polymer solution application. In other words, the time interval between each treating step was kept at a minimum.

The marble was then immersed in a substantially anhydrous acetone bath for ½ hour. Polymer solutions were prepared as follows: #1—85 parts of Epirez 504, viscosity at 25° C. of approximately 200 cps. was mixed with 15 parts of diethylene triamine (DETA, Union Carbide), and 15 parts of Epirez 502, which here functions as a plasticizer.

One-to-one mixtures (vol.) of each of the above, and acetone were prepared and samples of the marble were immersed therein for ¾ hour. A 75% vol. mixture of resin:acetone was then used for ½ hour (the DETA in each instance was reduced to 10 parts). A 90% vol. mixture of resin:acetone was then used for ½ hour (DETA =10 parts). The higher concentration resin in the outer layers will inhibit outward migration of low concentration resin within the deeper layers of the object. If outward flow is a problem, some silica gel is mixed in with the high concentration resin mixture.

The surfaces of each of the marble samples were then wiped clean with acetone, but using the acetone sparingly to avoid outward diffusion of the resin.

About one week was permitted for room temperature curing, which time span seemed to be sufficient for almost all of the acetone to evaporate from the samples.

Example 2

The procedure set forth in Example 1 was followed, except after wiping the surfaces clean, various very thin coatings were applied to the surfaces of the impregnated specimens. In one instance, a drying oil was coated, in another instance a polyurethane resin was coated, and in another instance, an acrylic resin was coated.

From experiments similar to those above, it has been found that most marbles can be treated with resins having a viscosity of from 100–5000 cps. Most sandstones require resins having a viscosity of 5000–10,000 cps. Low viscosity curing agents are generally preferred.

Example 3

Marble specimens 3 mm. x 4 mm. from a single tombstone source, were first impregnated with a resin, sectioned, polished and heated to char the resin to visualize the degree of impregnation. When the specimen was impregnated with a 95% volume solution of resin for ½ hour, the resin was found to have penetrated only a very thin peripheral zone and the boundary between the impregnated and non-impregnated areas was very strong.

When the specimen was first soaked in the acetone solvent and then immersed in a 95% resin solution for ½ hour, as described in Examples 1 and 2, the degree of penetration was found to be much deeper and the boundary between the impregnated and non-impregnated areas to be quite indistinct.

When the specimen was immersed only in a 70% volume resin solution for 1 hour, the depth of impregnation was appreciably increased, but the boundary between the impregnated and unimpregnated areas was still very distinct.

When the specimen was soaked first in acetone, as described above and then impregnated with 70% volume resin solution and 90% volume resin solution for ½ hour each, the impregnation was visually complete with no boundary layer.

Figure 3:
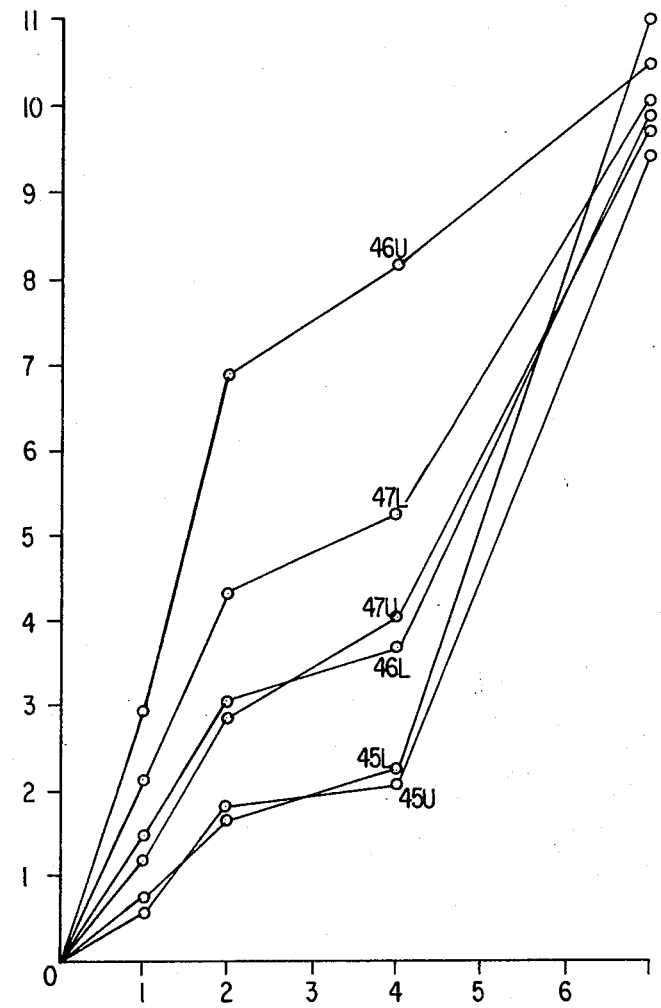
Figure 2:
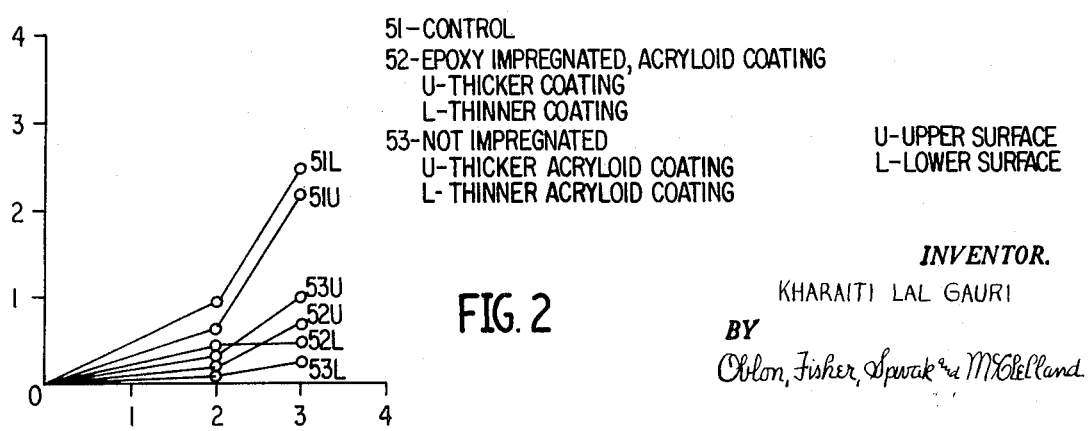

FIGS. 1 to 3 show the results of weathering tests for the treated and untreated marble stones which have been exposed to 200 p.p.m. (approximately) $SO_2$. The specimens consisted of an untreated control 48, and untreated control 51, an impregnated and polyurethane coated specimen 50, and impregnated and acryloid coated specimens 52 and 53, and epoxy impregnated specimen 49.

U and L refer to Upper and Lower surface of one specimen.

X-ray fluorescence and diffraction studies of these specimens after exposure to concentrated atmosphere show that a specimen surface with a heavy coating of epoxy deteriorates about six times faster than surfaces of an untreated specimen; but when coated with a thin coating of epoxy, the deterioration is reduced to ¾ of that of the untreated surface. Polyurethane coating reduces the comparative deterioration to about ⅓ and acryloid coating provides protection to deterioration to ⅙ of that relative to the untreated surface. Such a reduction may mean, in terms of time, hundreds of years.

Example 4

Samples of oak and ash woods having diameters of 2.5" and a length of 7" were impregnated with acetone, by being immersed in an acetone bath for 3 days. A first mixture of 50 parts by volume Epirez 510, 50 parts by volume Epirez 502 and 13 parts by volume diethyleneamine (DETA) was prepared with acetone in a volume ratio of 30:70 resin to acetone. The wood samples were immersed in a bath of this mixture for 24 hours.

A second mixture of 50 parts Epirez 510, 50 parts 502 and 12 parts DETA was prepared with acetone in a volume ratio of 50:50 resin to acetone. The wood samples were then immersed in a bath of this mixture for 20 hours.

A third mixture, similar to the second mixture but with a resin to acetone ratio of 70:30, was prepared and the wood samples were immersed therein for 4 hours.

A fourth mixture, similar to the third mixture, was prepared, except that the resin:acetone ratio was 95:5 and the wood samples were impregnated therein for 2½ hours.

After sufficient drying, it was found that the impregnated wood was characterized by substantially improved mechanical strength, and cross-section examination of the samples revealed that they were impregnated throughout. The samples were then permitted a one-month curing time. The samples were then subjected to a standard hammer tester wherein a 40 pound hammer is dropped from a height of 30"–35" repeatedly every 3 or 4 seconds onto the specimen being tested as the specimen is rotated so that it is subjected to impact over a length of 6" and over its entire periphery. Untreated specimens were completely demolished by this test procedure, whereas the treated specimens survived with very little noticeable damage.

Having now fully described the invention, it will be readily appreciated by one of ordinary skill in the art that many changes and modifications can be made without departing from the spirit or scope of the invention.

What is claimed as new and desired to be covered by Letters Patent of the United States is:

1. A process for preserving and strengthening wood or stone solid having pore sizes of $10^{-8}$ cm. to ½ mm., which comprises the following treatment:
   sequentially impregnating said solid with a plurality of solvent mixtures without intermittent drying between each impregnation, wherein each of said sequentially impregnating mixtures contains a higher concentration of a curable hydrophobic polymeric material than the previously impregnated mixtures;
   allowing the adjacent sequentially impregnating mixtures to remain in contact within the pores of said solid for a period of time sufficient to permit diffusion of the polymeric material and to minimize the presence of distinct concentration boundaries therebetween; and
   permitting said polymeric material to cure so as to form an impregnate of increasing concentration from within the impregnated solid toward the surface of said solid.

2. The process of claim 1 wherein the first solvent mixture treatment comprises treatment with a substantially anhydrous solvent which is succeeded by treatments of at least one sequentially applied polymeric material-solvent mixture.

3. The process of claim 2 wherein the successive treatments comprise one treatment with a substantially anhydrous solvent, and one treatment of said polymeric material-solvent mixture.

4. The process of claim 1 wherein the first solvent mixture treatment comprises treatment with at least one sequentially applied solvent-water mixture, which is succeeded by treatment with a substantially anhydrous solvent, which is then succeeded by treatments of at least one sequentially applied polymeric material-solvent mixture.

5. The process of claim 4 wherein the first of said solvent mixture is an acetone-water mixture having a volume proportion of from 70–95:30–5 solvent to water.

6. The process of claim 1 wherein said polymeric material is a monomer which is polymerized into said hydrophobic polymer after impregnation into the pores with said solvent.

7. The process of claim 1 wherein impregnation of said solvent mixtures is accomplished by immersing said solid into baths containing said mixtures.

8. The process of claim 1 wherein a coating which is impervious to carbon dioxide, sulfur dioxide, hydrogen sulfide and nitrogen oxide is applied to said solid after curing said polymeric material.

9. The process of claim 8 wherein said coating has a thickness of from 1–20 microns.

10. The process of claim 1 wherein residual polymeric material is substantially removed from the surface of said impregnated solid prior to curing.

11. A porous wood or stone solid having pore sizes of $10^{-8}$ cm. to ½ mm. and having increased strength properties and increased resistance to atmospheric pollutants characterized in that the pores of said solid are impregnated with a cured, hydrophobic polymeric material of continually increasing concentration from within the impregnated solid toward the surface of said solid without distinct concentration boundaries therebetween.

12. The porous solid of claim 11 wherein the surface of the impregnated solid is coated with a film which is impervious to carbon dioxide, sulfur dioxide, hydrogen sulfide and nitrogen oxide.

13. The porous solid of claim 11 wherein said cured hydrophobic polymeric material is selected from the group consisting of epoxide resin, acrylic resin, polyester resin, polyurethane resin, polystyrene, copolymers of styrene and acrylonitrile and silicone resin.

References Cited

UNITED STATES PATENTS

| | | | |
|---|---|---|---|
| 3,080,253 | 3/1963 | Dietz et al. | 117—123 D X |
| 3,672,943 | 6/1972 | Seibert et al. | 117—76 T X |
| 3,074,833 | 1/1963 | Ericks | 117—72 X |
| 3,407,086 | 10/1968 | Voisinet | 117—72 |
| 3,481,774 | 12/1969 | Kamal et al. | 117—72 X |
| 3,597,257 | 8/1971 | Dunn | 117—57 X |
| 2,500,783 | 3/1950 | Anderson et al. | 117—57 |
| 3,672,943 | 6/1972 | Seibert et al. | 117—76 T X |

OTHER REFERENCES

N.A.C.E. Surface Preparation of Concrete for Coating Materials Protection, January 1966, pp. 84–87.

RALPH HUSACK, Primary Examiner

U.S. Cl. X.R.

117—57, 64, 72, 113, 123 D, 148, Dig. 3

UNITED STATES PATENT OFFICE
CERTIFICATE OF CORRECTION

Patent No. 3,795,533          Dated March 5, 1974

Inventor(s) Kharaiti Lal Gauri

It is certified that error appears in the above-identified patent and that said Letters Patent are hereby corrected as shown below:

Column 6, line 14, "densist" should read -- densest --.
Column 9, line 59, after "strengthening" insert -- porous --.

Signed and sealed this 22nd day of October 1974.

(SEAL)
Attest:

McCOY M. GIBSON JR.
Attesting Officer

C. MARSHALL DANN
Commissioner of Patents